United States Patent
Mason (10) Patent No.: US 7,763,219 B2
(45) Date of Patent: Jul. 27, 2010

(54) IN-DRUM PYROLYSIS SYSTEM

(75) Inventor: J. Bradley Mason, Pasco, WA (US)

(73) Assignee: Studsvik, Inc., Columbia, SC (US)

( * ) Notice: Subject to any disclaimer, the term of this patent is extended or adjusted under 35 U.S.C. 154(b) by 631 days.

(21) Appl. No.: 11/717,970

(22) Filed: Mar. 14, 2007

(65) Prior Publication Data

US 2008/0039674 A1   Feb. 14, 2008

Related U.S. Application Data

(63) Continuation-in-part of application No. 10/209,090, filed on Jul. 31, 2002, now Pat. No. 7,491,861.

(51) Int. Cl.
*B01J 19/00* (2006.01)

(52) U.S. Cl. ........................ 422/198; 422/168

(58) Field of Classification Search .................. 422/198, 422/168
See application file for complete search history.

(56) References Cited

U.S. PATENT DOCUMENTS

| | | | |
|---|---|---|---|
| 4,419,943 A | 12/1983 | Faurholdt | |
| 4,609,537 A | 9/1986 | Tolpin et al. | |
| 4,654,172 A | 3/1987 | Matsuda et al. | |
| 4,692,318 A | 9/1987 | Tolpin et al. | |
| 4,977,839 A | 12/1990 | Fochtman et al. | |
| 4,987,313 A | 1/1991 | Baatz et al. | |
| 5,359,947 A | 11/1994 | Wagner | |
| 5,536,896 A | 7/1996 | Hesböl et al. | |
| 5,545,798 A | 8/1996 | Elliott | |
| 5,839,206 A | 11/1998 | Lisson et al. | |
| 5,909,654 A | 6/1999 | Hesböl et al. | |
| 5,910,621 A | 6/1999 | Harris et al. | |
| 6,084,147 A | 7/2000 | Mason | |

FOREIGN PATENT DOCUMENTS

WO   WO 2004/036117 A2   4/2004

*Primary Examiner*—Edward M Johnson
(74) *Attorney, Agent, or Firm*—King & Spalding LLP (57) ABSTRACT

An apparatus and method for processing hazardous wastes directly from 55-gallon drums through the use of pyrolysis and steam reforming. The method is based on a pyrolyzer using heat to vaporize organics that are present in the hazardous wastes. The waste is heated in the original drums to avoid the bulk handling of alpha radionuclides and to ensure criticality control. At pyrolysis temperatures, all liquids and organics in the drums will evaporate and volatize. The resulting waste in the drums is a dry, inert, inorganic matrix with carbon char containing radioactive metals. The off-gas produced by pyrolysis mainly consists of water vapor, volatized organics, and acid gases from the decomposition of various plastics and other organics present in the waste drums. The off-gas produced by the pyrolysis is then collected and fed into an off-gas treatment system that is in fluid communication with pyrolyzer operated under oxidizing conditions.

37 Claims, 6 Drawing Sheets

IN-DRUM PYROLYSIS SYSTEM

CROSS REFERENCE TO RELATED APPLICATIONS

The present application is a continuation-in-part of U.S. application Ser. No. 10/209,090, filed Jul. 31, 2002.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

The present invention relates generally to the processing of hazardous waste, and, particularly, the invention relates to a method and system for processing drummed or containerized hazardous waste using pyrolysis and steam reforming.

The use of high temperature reactors for the processing of drummed hazardous compounds is known to convert such materials into compounds that are acceptable for either reuse or release into the environment. These reactors employ various processes to achieve this result. Two such processes are pyrolysis and steam reforming.

Pyrolysis is well known for use in processing hazardous waste, including organic and radioactive wastes. For several decades, pyrolysis has been used in converting organic materials, such as biomass and municipal solid waste, into a synthesis gas, otherwise called syngas, that is rich in carbon monoxide, carbon dioxide, hydrogen, and light hydrocarbons. The syngas can thereafter by used to drive an engine, turbine, or boiler to general power. Modern pyrolysis systems have been built to process municipal solid waste at rates reaching several hundred tons of waste per day.

Steam reforming is also a well-known process for use in treating hazardous materials. Steam reforming has been used commercially for over a century for the production of syngas for the generation of power. Steam reforming has further been used as a source of hydrogen for use in chemical synthesis. For example, a majority of oil refineries have steam-reforming units to convert fuels into a source of hydrogen. Indeed, most fuel cell applications, including automobiles, also use steam reforming to generate a hydrogen rich gas from a liquid hydrocarbon fuel.

The pyrolysis and steam reforming processes are, therefore, well developed and well understood. Further, it is known to employ steam reforming and pyrolysis for use in processing hazardous wastes in drums, which avoids the bulk handling of these wastes. However, current methods employing these processes suffer from a number of disadvantages. For example, a majority of the methods using pyrolysis typically introduce hot gases into the system to directly react with the waste materials so that they are reacted. If hot, high volume heating gases are present in a method, the gas flow and gas composition within the system are more difficult to control. Other methods employing pyrolysis use internal combustion fired heat. These methods are generally incineration processes, which are becoming unacceptable from an environmental standpoint. Incinerators and related processes that utilize open-flame combustion fall under stringent and comprehensive air pollution laws that typically render the incinerators economically infeasible.

Methods for processing hazardous wastes that use steam reforming are also disadvantageous in that they are typically operated under oxygen starved or reducing conditions. Therefore, these methods may require auxiliary energy to fully react the material. Further, a separate unit may be required in these methods to oxidize the organics, carbon monoxide, and hydrogen to carbon dioxide and water so that release of gases to the environment can occur.

Accordingly, there remains a need for a process that does not have the limitations and shortcomings of the above described methods for processing hazardous wastes in drums through the use of pyrolysis and steam reforming.

SUMMARY OF THE INVENTION

According to its major aspects and briefly recited, the present invention is a method and apparatus for processing drummed or containerized hazardous waste through the use of pyrolysis and steam reforming. These processes convert organic material contained in the waste into a syngas that is rich in carbon monoxide, carbon dioxide, hydrogen, and light hydrocarbons.

In order to avoid bulk handling of the hazardous wastes, the wastes are processed directly in the containers, which are typically 55-gallon drums. Initially, the drums of waste are placed in an airlocked inlet where they are punctured and adapted with a filter. The drummed or containerized hazardous wastes are then heated in a pyrolyzer including a pyrolysis chamber having an inner sleeve within an outer vessel by an indirect heat source using conductive or radiative heat transfer elements, such as electrical heaters that are external to the inner sleeve. Optionally, combustion fired heat that is external to the inner sleeve can be used. The term indirect heat source refers to a source of heat that is external to the inner sleeve of the pyrolysis chamber and that provides heat to the interior of the inner sleeve. The use of an electrical heater that is internal or located within the pyrolysis chamber is also contemplated by the present invention.

At pyrolysis temperatures, all liquids and organics in the hazardous waste drums evaporate and volatize. The off-gas produced by pyrolysis, which consist of water vapor, volatized organics, and acid gases, is then fed into an off-gas treatment system. Low flow purge gas is used to sweep the off-gases out of the pyrolyzer and to the off-gas treatment system that is in fluid communication with the pyrolyzer.

In a first embodiment the off-gas treatment system includes a single steam reformer vessel and a downstream scrubber. After leaving the pyrolysis chamber, the off-gas stream enters the steam reformer vessel, which is operated under oxidizing conditions for the conversion of organic vapors to water and carbon dioxide. Acid gases present in the off-gas stream are neutralized by the introduction of caustic materials in the downstream scrubber.

In a second embodiment of the present invention, the off-gas treatment system includes a vapor condenser and downstream filters for the processing of organics. After leaving the pyrolysis chamber, the off-gas stream enters the vapor condenser where water and organics such as hydrocarbons are condensed into liquids. The liquid from the condenser is then sent downstream for further processing of the organics, whereas the non-condensable gases are sent from the condenser to downstream filters for the removal of trace organics.

In a third embodiment, the off-gas treatment system includes a vapor condenser, a steam reformer, and a downstream scrubber. The off-gas stream first enters the vapor condenser after leaving the pyrolysis chamber. The condensed liquids are then introduced into the steam reformer. Before being introduced into the steam reformer, the non-condensable gases from the condenser are mixed with steam to form the fluidizing gases for the steam reformer vessel. In the steam reformer, which is operated under oxidizing conditions, the organic vapors are converted to water and carbon dioxide. Finally, the acid gases from the off-gas stream are neutralized by the introduction of caustic materials in the downstream scrubber.

In a fourth embodiment, the off-gas treatment system includes a thermal oxidizer and a downstream filter. The thermal oxidizer may include a catalytic oxidizer, a ceramic matrix, or a standard combustion oxidizer. Off-gas is first sent to the thermal oxidizer for conversion to carbon dioxide and water. Next the acid gases present in the off-gas stream are sent to a downstream scrubber for neutralization.

A feature of the present invention is the use of an indirect heat source to pyrolyze drummed or containerized waste. Current methods that employ pyrolysis for the processing of hazardous wastes in drums heat the wastes directly through internal combustion fired heat or through the introduction of hot gases into the pyrolysis chamber. In cases in which indirect heat sources are used, the methods involve the processing of bulk wastes rather than containerized wastes. The use of an indirect heat source to pyrolyze containerized waste has numerous advantages. Through the use of indirect heating, both the gas flow and the gas composition inside the pyrolyzer can be more readily controlled. The use of direct heating with hot gases, for example, increases the volume of off-gases, as well as particulate carry out. Further, the processing of such wastes as radioactive wastes in containers or drums avoids the bulk handling of alpha particle-emitting radionuclides and ensures criticality control. Finally, the use of indirect heating that is external to the inner sleeve of the pyrolysis chamber or internal to the pyrolysis chamber wall, whereby the heating is performed largely due to radiant heat transfer without combustion of the wastes, renders the process a non-incineration process, because there is no open flame combustion in the pyrolyzer or off-gas stream. Alternatively, heaters that are internal to the inner sleeve can be employed. These heaters will include heater tubes or sleeves so that there is a barrier between the electrical heating elements and the contents of the inner sleeve.

Another feature of the present invention is the use of low flow purge gas to sweep the off-gases out of the pyrolysis chamber and to the off-gas treatment system. Low flow purge gas minimizes particulates carryover from the drums or containers to the off-gas stream. This feature is especially important with the processing of certain radioactive wastes, which are very energetic and can easily fly into the gas stream or become airborne with moderate gas velocities. Further, gas composition can be more carefully controlled with the use of low flow purge gases, as opposed to hot high volume heating gases. For example, it is possible to use carbon dioxide as the low flow purge gas to convert corrosives that may be present in the waste into stable compounds, such as carbonate salts.

Still another feature the present invention is the placement of a particulate filter on the drum vent opening. Alternatively, the drum or waste container can be placed inside a larger container that is provided with a filter means to keep waste particles from escaping the drum or container. This feature dramatically reduces the carryover of radioactive particles from the sealed container.

Yet another feature of the present invention is the use of an off-gas treatment system including a steam reformer operated under oxidizing conditions. Current methods using steam reforming for the processing of off-gas generated from the pyrolysis of drummed wastes operate the steam reformer vessel under oxygen starved or reducing conditions. Therefore, gases such as carbon monoxide must be further reacted downstream by such means as a catalytic converter before being released into the environment. In the present invention, organics are directly converted into carbon dioxide and water in a single steam reformer vessel so as to avoid additional processing downstream.

Another feature of the present invention is the use of a pressure cycle method to move gases into and out of the container vent hole in a controlled rate and flow volume. This feature allows a slow and controlled interchange of gases, including purge gases and syngas, from the inside of the containers to the interior of the pyrolysis chamber. A particular advantage of this is that a purge gas such as carbon dioxide, steam or other reactive gas could be used whereby the pressure cycles move the carbon dioxide or reactive gas into and out of the drum or container such that waste components are converted by the carbon dioxide into carbonates (e.g., sodium metal into sodium carbonate) or steam into volatile gases such as carbon dioxide, carbon monoxide, water vapor and hydrogen. Accordingly, purge gases can be used to neutralize corrosives contained in the waste material.

Still another feature of the present invention is the use of a semi-continuous pyrolysis process. Through the use of both inlet and outlet airlocks, semi-continuous processing of the drums is achieved as opposed to typical strict batch operations.

Other features and advantages of the present invention will be apparent to those skilled in the art from a careful reading of the Detailed Description of the Preferred Embodiments presented below and accompanied by the drawings.

DETAILED DESCRIPTION OF PREFERRED EMBODIMENTS

The present invention is generally an apparatus and method for processing hazardous wastes in containers, which typically include 55-gallon drums. The present apparatus and method will be described in particular with hazardous wastes, such as transuranic wastes, containing both organic and radioactive materials, but any organic material-containing waste can be processed in accordance with the following method and with the components of the system.

The method is based on a pyrolyzer 10 using heat to vaporize organics that are present in the hazardous wastes. The waste is heated in the original drums where possible to avoid the bulk handling of alpha particle-emitting radionuclides and to ensure criticality control. At pyrolysis temperatures of about 200° C. to about 800° C., all liquids and organics in the drums will evaporate and volatize. The newly generated waste in the drums is a dry, inert, inorganic matrix with carbon char containing radioactive metals. The off-gas produced by pyrolysis mainly consists of water vapor, volatized organics, and acid gases from the decomposition of various plastics and organics present in the waste drums. The off-gas produced by the pyrolysis is then collected and fed into an off-gas treatment system 80 that is in fluid communication with pyrolyzer, which may include a vapor condenser or a steam reformer and downstream scrubber, or a combination of a condenser and a steam reformer. In the case a steam reformer is used, steam reformation and oxidation reactions take place in the steam reformer to convert organic vapors to water and carbon dioxide at temperatures between about 800° C. and about 1,000° C.

The radionuclides present in the drummed waste are retained in the original drums because radioactive metals will not volatize at pyrolysis temperatures, and the pyrolyzer off-gas flow is kept at a rate that will avoid the carryover of the radionuclides. To ensure that radionuclides do not go airborne, a filter can be placed in the container vent hole and a form of back-up protection, such as a ceramic filter, can also be provided downstream of the pyrolyzer. This method results in over 99.96% retention of radionuclides in the waste.

The method of the present invention also provides the conversion of reactive metals and compounds into stable compounds that are easily disposed. Such compounds as metallic sodium, potassium, calcium, magnesium, uranium and compounds, such as cyanide, are potentially reactive materials that can burn, ignite, or even explode when exposed to certain other materials or when exposed to varied environmental conditions. The pyrolyzer can thermally treat and stabilize these reactive metals by converting them into stable compounds. The reactive metals present in the drummed or containerized transuranic or fuel debris wastes are fine powders that are strongly reducing when heated above 500° C. The strongly reducing metals will bond or react with oxygen, steam, carbon oxides, chlorine, or fluorine in the solid inorganic waste or gases near the reactive metals, such as the purge gas contents. One or more stable compounds that are produced include $NaCl$, $Na_2CO_3$, $Na_2SO_3$, $KCl$, $K_2CO_3$, $K_2SO_3$, $CaO$, $CaCO_3$, $CaCl_2$, $CaSO_3$, $U_2O_3$, $U_3O_8$, $MgO$, $MgCl_2$, $MgCO_3$, and $MgSO_3$. Through the present invention, metallic uranium fuel pieces can be converted into inert, non-reactive uranium oxide metal. Cyanides, if present, will volatize from the drummed wastes and will oxidize in the steam reformer to water, carbon dioxide, and nitrogen.

Other hazardous wastes capable of being processed by the present invention include nitrogen containing wastes, including NOx, liquids with flash points of less than 60° C., which are evaporated, and aqueous liquids with a pH of less than 2 or greater than 12.5, which are converted to stable compounds such as $NaCl$, $Na_2CO_3$, $Na_2SO_3$, $KCl$, $K_2CO_3$, $K_2SO_3$, $CaO$, $CaCO_3$, $CaCl_2$, $CaSO_3$, $MgO$, $MgCl_2$, $MgCO_3$, and $MgSO_3$. Therefore, these wastes can be thermally stabilized and/or volatized from the drummed wastes.

Figure 1:
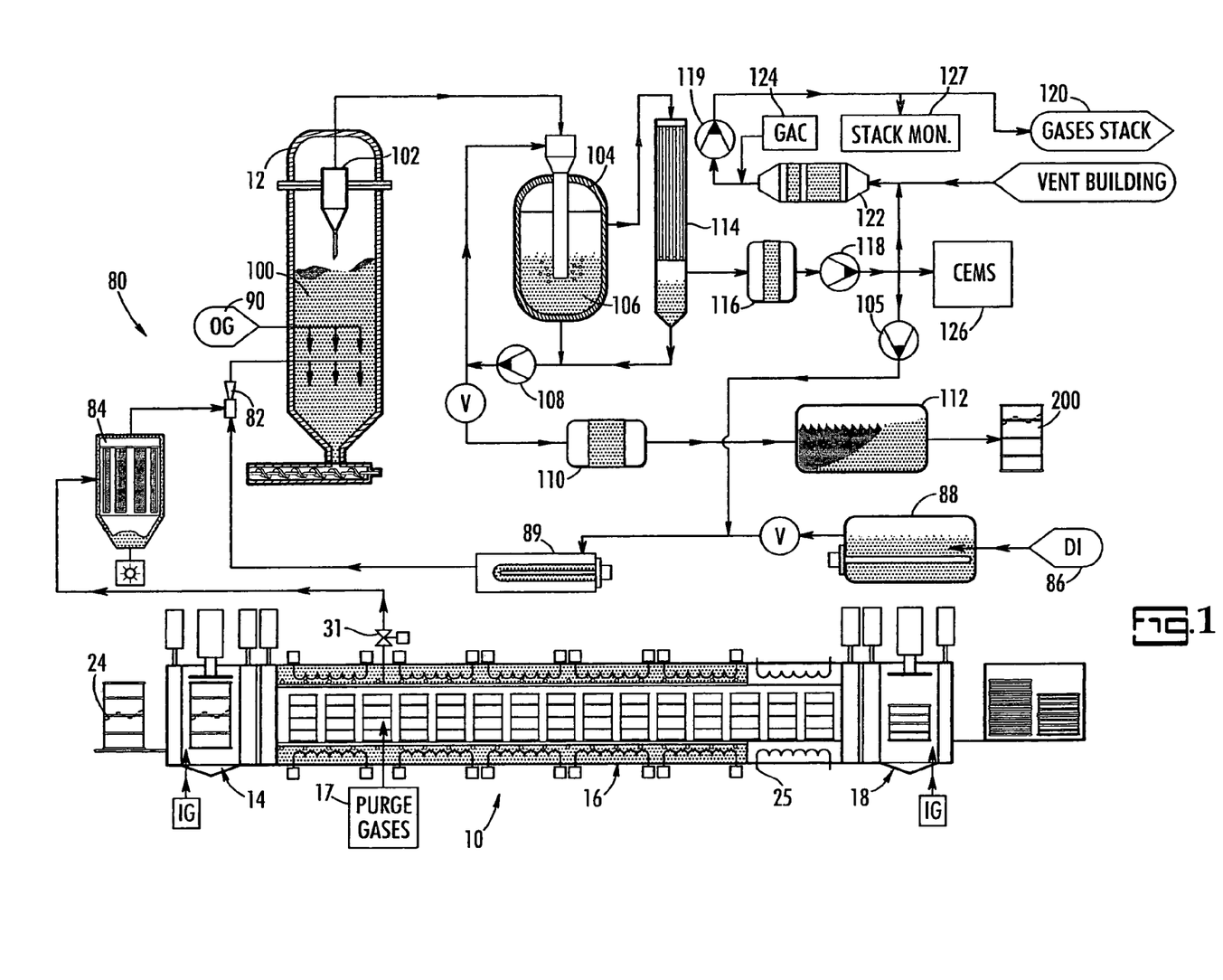
FIG. 1 is a schematic illustration of a system for processing containerized waste including a pyrolyzer and a steam reformer that are in fluid communication according to a preferred embodiment of the present invention.
Figure 2A:
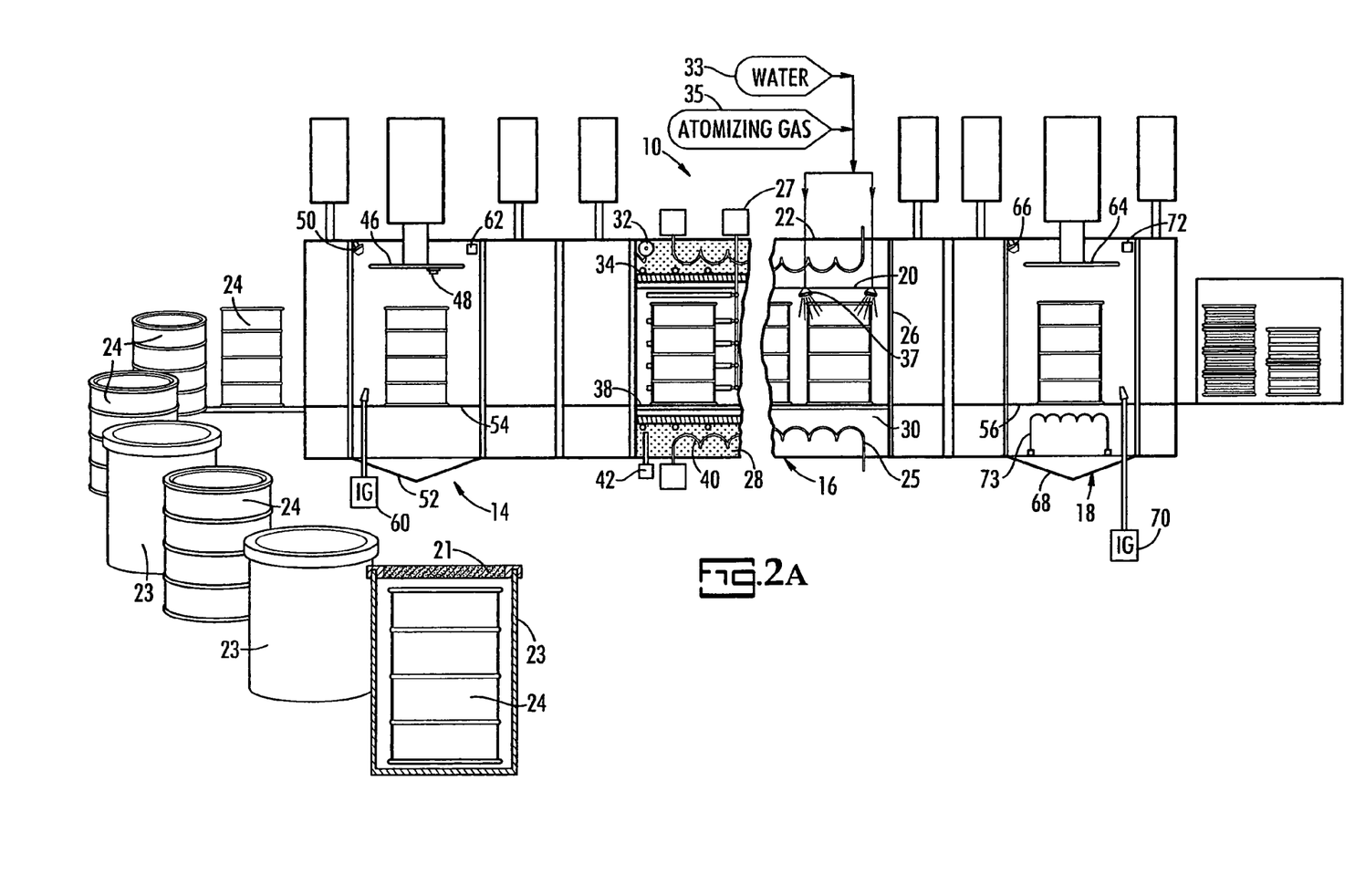
FIG. 2A is a schematic illustration of the pyrolyzer for use in processing containerized waste according to a preferred embodiment of the present invention
Figure 2B:
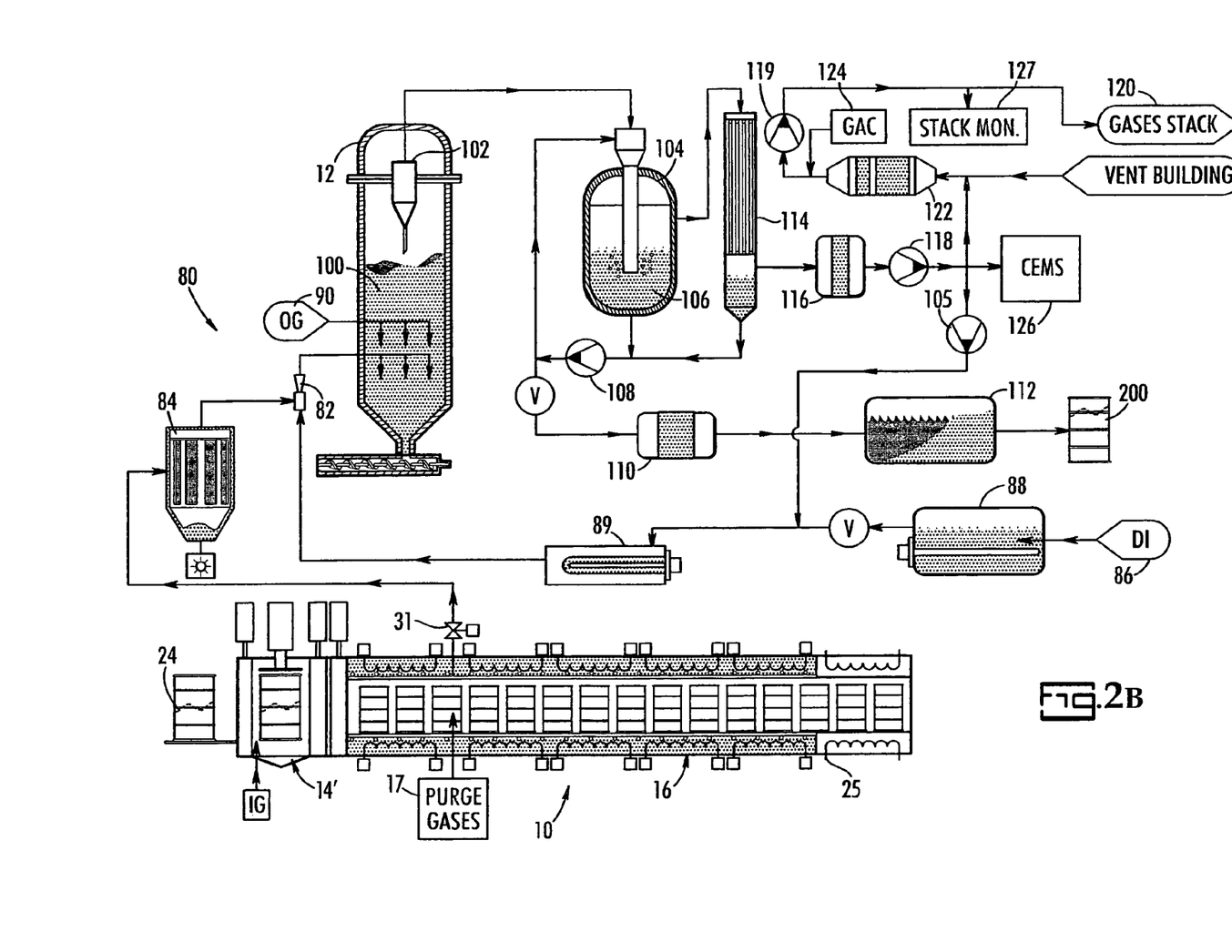
FIG. 2B is a schematic illustration of a system for processing containerized waste including a pyrolyzer and a steam reformer that are in fluid communication according to a preferred embodiment of the present invention.

Referring now to FIGS. 1, 2A and 2B, there is shown a system for processing containerized waste including a pyrolyzer 10 and a steam reformer 12 according to a preferred embodiment of the present invention. Preferably, pyrolyzer 10 includes a waste inlet 14, a pyrolysis chamber 16, and a gas outlet 18. These features are shown in detail in FIG. 2A.

Focusing first on the pyrolysis chamber 16, FIG. 2A shows pyrolysis chamber 16 as being a dual-walled vessel, including an inner sleeve 20 and an outer vessel 22, which is preferably cylindrical in shape. Pyrolysis chamber 16 further includes a purge gas supply 17 that introduces inert and/or reactive purge gases to the interior of inner sleeve 20. Inner sleeve 20 of pyrolysis chamber 16 is dimensioned to receive plural drums 24 of waste. Although the wastes are typically contained within steel 55-gallon drums that are well known in the art, any container holding wastes can be processed by the present invention. In an effort to make the system semi-continuous, a drum transfer mechanism 38 is provided within inner sleeve 20. Although other transfer mechanisms are contemplated, drum transfer mechanism 38 is preferably a walking beam or sliding inclined plane mechanism. Further, a conveyor type mechanism is contemplated by the present invention. Inner sleeve 20 may be constructed of a high-temperature-resistant alloy suitable for contact with pyrolysis gases, which include acid gases, hydrocarbon gases, and evaporated water from the contents of drums 24.

Various features are included in pyrolysis chamber 16 to enhance its integrity and durability during the pyrolysis processes. The outer vessel 22 may be a pressure containment vessel that provides a secondary sealed barrier to the environment. Outer vessel 22 may further include a refractory jacket cover, an insulation jacket cover, and a metal shell. Further, outer vessel 22 is preferably explosion resistant and designed to retain all gas expansion from over-pressure or off-normal events. An annulus 30 that is formed between the inner sleeve 20 and the outer vessel 22 serves as the dual containment barrier that will prevent loss of containment in the case of failure of the inner sleeve 20 integrity. A gas overpressure can be maintained in the annulus 30. As used herein, "overpressure" refers to pressure in excess of normal atmospheric or system operating pressure. Further, a loss-of-pressure alarm 32 can be provided in pyrolysis chamber 16 that will indicate a failure of the inner sleeve 20 integrity, e.g. crack in inner sleeve 20 wall, poor seal, etc. The integrity of inner sleeve 20 can further be enhanced by plural annular rings 34, which transfer inner sleeve 20 load to the outer vessel 22. If annular rings 34 are included, they are preferably spaced approximately 18" apart to reduce sagging and stress on inner sleeve 20.

The heat source for the pyrolyzer 10 is preferably an indirect heat source using conductive or radiative heat transfer such as electrical heaters 40 that are external to the inner sleeve 20, but that provide heat to the interior of inner sleeve 20. Most preferably, electrical heaters are ceramic-insulated and are located within the annulus 30. Optionally, combustion fired heat that is external to the inner sleeve 20 and within annulus 30 can be used. The term indirect heat source refers to a source of heat that is external to the inner sleeve 20 and that provides heat to the interior of the inner sleeve 30. As shown in FIG. 2A, the use of an optional internal electrical 27 heater that is located within inner sleeve 20 is also contemplated by the present invention. In the case that electrical heaters are located within interior sleeve 20, these heaters are preferably sheathed in an alloy tube to prevent direct contact of the heaters with the pyrolysis gases, such as organics, sulfur-containing compounds, including SOx, and nitrogen-containing compounds, including NOx. These heaters will include heater tubes or sleeves so that there is a barrier between the electrical heating elements and the contents of the inner sleeve 20.

As previously discussed, the use of indirect heat through conductive/convective or radiative heat transfer is a particular feature of the present invention. Current methods that employ pyrolysis for the processing of hazardous wastes in drums heat the wastes directly through internal combustion fired heat or through the introduction of hot gases into the pyrolysis chambers. Through the use of indirect heating, both the gas flow and the gas composition inside the pyrolysis chamber 16 can be more readily controlled. The use of direct heating with hot input gases, for example, dramatically increases the volume of off-gases, as well as particulate carry out. Further, the use of heating that is external to inner sleeve 20 of pyrolysis chamber 16 renders the process a non-incineration process, because there is no open flame combustion in the pyrolysis chamber 16. The use of internal electrical heaters is also advantageous over other direct heating methods, in that the heaters do not introduce hot gases to the system as opposed to internal combustion type methods. Moreover, use of electrical heaters avoid various state and federal regulations disfavoring combustion fired heat.

The pyrolysis chamber 16 can also be adapted with features for managing the temperature within the chamber 16. For example, a thermocouple instrument 42 can be provided to control the temperature of pyrolysis chamber 16. In order to provide for thermal growth of inner sleeve 20 as compared with the fixed outer vessel 22 during the pyrolysis, a thermal expansion element 26 can be included between the inner sleeve 20 and the outer vessel 22. Optionally, but preferably, an insulation layer 28 is provided within the annulus 30 to prevent the passage of heat out of the inner sleeve 20. As a further safety provision, both the thermocouple instrument 42 and the electrical heaters 40 are adapted so that they can be removed and replaced without having to enter the pyrolysis chamber 16.

Turning next to the inlet 14 and outlet 18 of the pyrolyzer 10, FIG. 2A illustrates these features of the present invention in detail. Preferably, both inlet 14 and outlet 18 include airlocks to isolate the atmosphere of the interior of pyrolyzer 10 from that of its exterior. Further, inlet 14 includes a drum transfer mechanism 54 to move drums 24 from the airlocked inlet 14 to pyrolysis chamber 16, and outlet 18 includes a drum transfer mechanism 56 to move drums 24 from pyrolysis chamber 16 into the airlocked outlet 18. The use of both inlet and outlet airlocks, as well as drum transfer mechanisms, allows for a semi-continuous processing of the drums 24. This feature is advantageous over other processes that use a strict batch operation.

As further illustrated in FIG. 2A, inlet 14 can optionally include a drum punch 46 and a drum filter application device 48. These features allow for the puncturing and placement of a filter on each of the drums 24. Where there is to be processing of the wastes directly from the drums 24, the drums 24 must be punctured to form vent holes so as to allow all gases to escape from the drums 24 during pyrolysis heating. In situations where radioactive wastes are being processed, it is also important and advantageous to provide filters over the punctures in order to prevent carryover of radioactive particulates into the off-gas stream. The filters can include a sintered metal disk, a ceramic disk, or a ceramic cylinder. The preferred filter includes a flexible ceramic fabric with a swage insert to seal the drum lid penetration or puncture so that gases in the drums 24 must pass through the filter media. Optionally, the filter may also include a filter bag that is placed around the drums 24. The filter device can be installed at the same time that the drum lid is punctured to open a vent path of evolved gases. Alternatively, as shown in FIG. 2A, each drum 24 can be placed inside a larger container 23 that is provided with a filter means 21 to keep waste particles from escaping the drum or container. Additionally, the outer container can be an outer box or an overpack drum. This feature can dramatically reduce the carryover of hazardous particles, such as radioactive particles, from the sealed container.

Also present in the inlet 14 can be a washdown spray 50 with a drain or reservoir 52 to clean the interior of the airlocked inlet 14 and the drums 24 before entering the pyrolysis chamber 16. Inlet 14 can further include an inerting gas supply 60 for providing an inert environment for the drums 24, and an oxygen analyzer 62 for detecting the presence of oxygen. Preferably, inlet 14 can be monitored by remote means such as closed-circuit television (CCTV).

As further shown in FIG. 2A, outlet includes a compactor 64 for compacting drums 24 into a size convenient for transport and storage. Similar to inlet 14, outlet 18 can include a washdown spray 66 with a drain or reservoir 68 to clean the interior of the airlock surfaces. An inerting gas supply 70 is also included in outlet 18 to provide for an inert atmosphere. To verify the completion of the pyrolysis process, outlet 18 can further be provided with an off-gas sample analyzer 72, which analyzes such materials as volatile organic carbon (VOC) and total hydrocarbon (THC). Optionally, a cooling device 73 is present in outlet 18 to cool drums 24 as they are being compacted.

Although the inlet 14 and outlet 18 can be located separately, as shown in FIG. 2B, the inlet 14' can also serve as the outlet 18 for the pyrolysis chamber 16. Just as the drum transfer mechanism 56 can transfer drums 24 into the chamber 16, the mechanism can also be reversed so as to transfer the drums 24 out of the chamber 16. In this embodiment, the inlet 14' could include the features important to and similar to outlet 18, such as a compactor, a washdown spray, an inerting gas supply, an off-gas sample analyzer, and, optionally, a cooling device.

To begin the in-drum waste processing method of the present invention, intact drums 24 of waste are introduced into inlet 14 where they are punctured to allow gases to escape during pyrolysis heating, and where they are adapted with a filter over the puncture to retain radionuclide particulates. As previously discussed, alternatively the drums 24 are placed inside a larger container that is provided with a filter means to keep waste particles from escaping the drums 24 prior to their transfer into the pyrolysis chamber 16. Once prepared to retain particulates, the drums 24 are then transferred into the inner sleeve 20 of pyrolysis chamber 16 where they are heated to pyrolysis temperatures ranging between about 200° C. and about 800° C., preferably by electrical heaters 40 that are located within the annulus 30. Alternatively, the electrical heaters 27 are within the inner sleeve 20 but include outer shields or sleeves. The pyrolyzer 10 is designed to fully volatize and remove >99% of the organics from the waste streams, regardless of the organic composition. After volatilization of organics is complete, the drums 24 are transferred out of pyrolysis chamber 16 and into outlet 18 in a semi-continuous mode, where they are prepared for shipping. Before entering outlet 18 where they are compacted, drums 24 are cooled in pyrolysis chamber 16 by cooling coils 25. Alternatively, and preferably, cooling of the drums 24 or containers can be efficiently achieved by direct cooling using a finely atomized spray or water droplets that have a very high surface area. In particular a source of water 33 and a source of atomizing gas 35, such as $N_2$, can be operatively connected to a plurality of spray nozzles 37 to provide a direct cooling means. The fine mist of water droplets quickly adsorbs heat from the gases in the pyrolyzer 10, from radiated and convective heat from the drum 24 or container, and from the inner walls of the cooling section of the pyrolyzer 10. The water droplets evaporate into steam that is carried out of the pyrolyzer 10 to the off-gas system 80. This direct cooling method maintains surfaces dry in the pyrolyzer 10 and provides cooling that can be as much as an order of magnitude faster than indirect cooling and/or allowing the drum 24 or container to cool without cooling. For batch type operation of the pyrolyzer 10, the waste drum 24 or container can be inserted into the pyrolyzer 10 and sealed and the heating cycle performed. Following the heat step, rapid cooling can be achieved of the drum 24 or container of waste residues as well as of the pyrolyzer inner sleeve 20 by using the direct water spray cooling method. This is a significant advantage of the invention as it provides improved treatment times by as much as a factor of 2 times. The water mist cooling can be provided by introducing the water mist preferably into the actually inner pyrolysis chamber or alternatively outside of the chamber so that in the latter case the steam is not mixed with the pyrolyzer gases.

Organics with low to medium boiling points (less than 650° C.) will readily evaporate and form organic vapors that will flow out of the drums 24 and into the off-gas stream. Organics with low boiling points are the source for volatile organic compounds (VOCs) found in the headspaces of many drums 24. VOCs are, therefore, fully removed from the waste and enter the off-gas stream. Typical pyrolyzer 10 off-gases include water vapor, carbon monoxide, carbon dioxide, volatile hydrocarbons (organics), hydrogen, and hydrochloric acid.

Organics with high boiling points, such as high molecular weight polymers and plastics, are also fully pyrolyzed. Exposure to temperatures above 450° C. causes the organic polymer structure to break. The long carbon-hydrogen chain molecules break into smaller, more volatile organics, thereby gasifying the organic constituents. The thermal breakdown of the long polymers leaves behind a carbon-rich, inorganic char that is inert and non-volatile. This carbon pyrolysis residue is an inert inorganic residue that has only small hydrogen content. The pyrolyzed residues are, therefore, practically inert to alpha particle interaction.

Once the organics have been vaporized into what have been described as the pyrolysis gases, low flow gas purge from the purge gas supply 17 is used to sweep the pyrolysis gases out of the pyrolysis chamber 16 so that they can be further processed by the off-gas treatment system 80 including steam reformer 12. The purge gases can include steam, carbon dioxide, and inert gases in any mixture. Purge gas flow rate can be provided to achieve 1 to 100 volumetric changes of gas per hour, and, preferably, the purge gas flow rate achieves about 4 to 10 volumetric changes of gas per hour. The preferred purge gas contains carbon dioxide, which can react with any corrosive materials, as well as reactive metals present in the waste to form stable, non-hazardous carbonate salts. As described, the use of a purge gas such as carbon dioxide, steam or other reactive gases provides additional opportunities to convert the waste components into materials that are more easily handled and processed. For example, waste components are converted by the carbon dioxide into carbonates (e.g., sodium metal into sodium carbonate), or by the steam into volatile gases such as carbon dioxide, carbon monoxide, volatile organics, water vapor and hydrogen. In particular, purge gas is forced to enter the drums 24 by means of purge gas pressure swings in the inner sleeve 20 of pyrolysis chamber 16. The pressure of the purge gas can be cycled in the pyrolysis chamber 16 by means of increasing or decreasing the eductor motive gas flow of a downstream eductor 82 or opening and closing the gas outlet valve between the pyrolyzer 10 and the filter or steam reformer 12 or off-gas system 80. The eductor 82 draws a vacuum on pyrolysis chamber 16 and, therefore, draws the gases out of the pyrolysis chamber 16. A higher eductor motive flow equates to higher vacuum in the pyrolysis chamber 16. Additionally, pressure within the pyrolysis chamber can be changed through the use of a pressure cycle valve 31 that can be closed to increase pressure and opened to decrease pressure. The cyclical pressure and/or vacuum swings cause the low flow purge gases to pass in and out of the drums 24, through the drum lid filters, 21 and 48, at a controlled rate and velocity. These swings range preferably from about −20 inch water column to about −100 inch water column, for vacuum, or from near ambient pressure to up to about 50 psig, and, preferably, ambient to about 10 psig, for pressure.

As previously discussed, the use of low flow, cyclical pressure swing purge gas rates is a particular feature of the present invention. By eliminating the input of hot gases, as are used in current methods, the quantity and composition of the purge gas in the pyrolysis chamber 16 can be regulated to provide minimal flow rates. This reduction in the volume, and hence the reduction of velocity of gases, will minimize the agitation and subsequent carryover of particulates out of the drums 24 and into the off-gas system 80. This feature is especially advantageous when certain radioactive wastes are being processed, because the build up of radioactive particles in the off-gas system 80 could result in the loss of criticality control, as well as the build-up of radiation levels in the off-gas system 80.

After leaving the pyrolysis chamber 16, the off-gas stream, which includes the pyrolysis gases, proceeds towards the off-gas treatment system 80 that is in fluid communication with the pyrolyzer 10. As a form of back-up protection to prevent radionuclides from going airborne, downstream from the pyrolysis chamber 16 is provided a ceramic or sintered metal filter 84. After passing through ceramic filter 84, the off-gas stream is next sent to the eductor 82 where it is mixed with steam and then introduced into the steam reformer 12. The pyrolysis gases and steam mix to form the fluidizing gases for the steam reformer 12. In addition to these fluidizing gases, an oxidizing gas supply 90, preferably oxygen, is also introduced into the steam reformer 12 to oxidize and reform the VOCs, carbon monoxide, and hydrogen in the off-gas stream from the pyrolysis process. Therefore, the fluidizing gases can include steam, steam and oxygen, steam and purge gases, a combination of steam, purge gases, and oxygen, steam and carbon dioxide, and a combination of steam, carbon dioxide, and oxygen. Preferably, the steam is superheated and is generated from a source of deionized water 86, which is first sent to a steam generator 88, and then to a superheater 89, which heats the steam to a temperature between about 500° C. and 1,000° C.

Preferably, the steam reformer 12 is maintained in autothermal mode during the reforming and oxidizing reactions. Autothermal mode refers to a mode in which the steam reformer 12 is operated at about 800° C. to about 1,000° C., whereby energy needs of the steam reformer 12 are supplied by external electrical heaters (not shown), the incoming superheated steam, and by the exothermic oxidation reactions of the organics present in the waste.

Steam reformer 12 further includes bed media 100 that is used in the steam reformer reactions. Bed media 100 can be any inorganic solids, however, the preferred material includes sized beads of a mixture of one or more acid neutralization agents such as calcium carbonate, lime, clay, or magnesia.

These agents can adsorb acid gases, such as Cl, S, and F directly from the gases in the reformer 12 and neutralize them to form stable calcium, magnesium, or alumino-silicate compounds. Bed media 100 and fine solids product formed as a result of the steam reforming reactions are largely retained in the steam reformer 12 by means of a solids separation device built into reformer 12, such as a cyclone 102 (shown), or a filter.

Additionally, additives, such as base metal catalysts such as oxides of manganese, copper, chromium, cobalt, iron and nickel, or noble metal catalysts such as Pt and Pd, can be utilized in the steam reformer to provide improved conversion of organics to carbon dioxide and water. These additives help oxidize organics to $CO_2$ and water at lower temperatures and with higher efficiency.

A particular feature of the present invention is the use of off-gas treatment system 80 including steam reformer 12 that is operated under oxidizing conditions. Current methods using steam reforming for the processing of off-gas generated from the pyrolysis of drummed wastes operate the steam reformer 12 vessel under oxygen-starved or reducing conditions. Therefore, gases such as carbon monoxide must be further reacted downstream by such means as a catalytic converter before being released into the environment. In the present invention, off gases from the pyrolysis process consist of water vapor (steam), volatized organics, and acid gases from the decomposition of plastic and other organics in the drums 24. The pyrolysis gases are subjected to reformation and oxidation reactions in the steam reformer 12, which will fully convert all organics to carbon dioxide and water vapor. Therefore, the off-gas treatment system avoids additional processing of gases such as carbon monoxide downstream from the steam reformer 12.

Although the steam reformer 12 fully converts the organics present in the incoming off-gas stream to carbon dioxide and water vapor, the acid gases from the pyrolyzer 10 that pass through the steam reformer 12 unreacted are neutralized by a downstream scrubber 104 or quencher. The quantity and makeup of the acid gases depend on the type and quantity of plastics and other organics in the drums 24. For example, polyvinyl chloride (PVC) contains significant quantities of chlorine that become volatized in the pyrolyzer 10. Scrubber 104 instantly cools the hot steam reformer 12 off-gases, and the acid gases are adsorbed by a scrubber water solution 106. Preferably, the scrubber solution is neutralized by the injection of metered quantities of caustic materials to form stable salts, such as NaCl, $Na_2SO_4$, and NaF. The salt solution is continuously recirculated into scrubber 104, preferably through a pump 108. Periodically, the recirculating salt solution is transferred through an optional ion-exchange filter 110 and to a salt dryer 112. The small volume of dried salt is then packaged for subsequent disposal at 200. The salts generated are mainly NaCl and $Na_2SO_4$ from the pyrolysis of chlorinated organics, plastic, and rubber in the containerized waste, and contain <0.01% of the total radionuclides of the incoming containerized waste.

The gas stream leaving scrubber 104 is largely made up of water vapor and low-volume carbon dioxide. Preferably, this gas stream is sent through a water condenser 114. The water that is collected in water condenser 114 is then recycled into scrubber 104. The gas stream is then sent through a demister 116 for the removal of liquid droplets and then it is sent through a process blower 118. At this point, the gas stream can be recycled to the steam line, where it can be reused as a fluidizing gas by means of blower 105. Alternatively, the gas stream can be sent through a ventilation blower 119 and discharged from a gases stack 120 or plant stack in the operating facility after being passing through a HEPA filter 122 and a granulated activated carbon (GAC) absorber 124 for the removal of trace particulates and organics, respectively. Preferably a continuous emission monitor system (CEMS) 126 is provided for the monitoring of this gas stream. Additionally, a stack monitor 127 is provided to monitor any trace radionuclide particles in the gas stream as it is being discharged from gases stack 120.

The described method generates very little secondary waste because most of the secondary waste streams can themselves be collected and fed into the pyrolyzer 10 for pyrolysis and volume reduction. For example, chemicals, oils, and solutions that may be used for maintenance and decontamination activities can be pyrolyzed to produce an inert residue that can be packaged and disposed. Further, personal protective equipment can also be pyrolyzed and packaged. As previously described, the scrubber 104 salts are dried and packaged for disposal. Additionally, the water that is present in the system is evaporated and discharged through gases stack 120.

Figure 3:
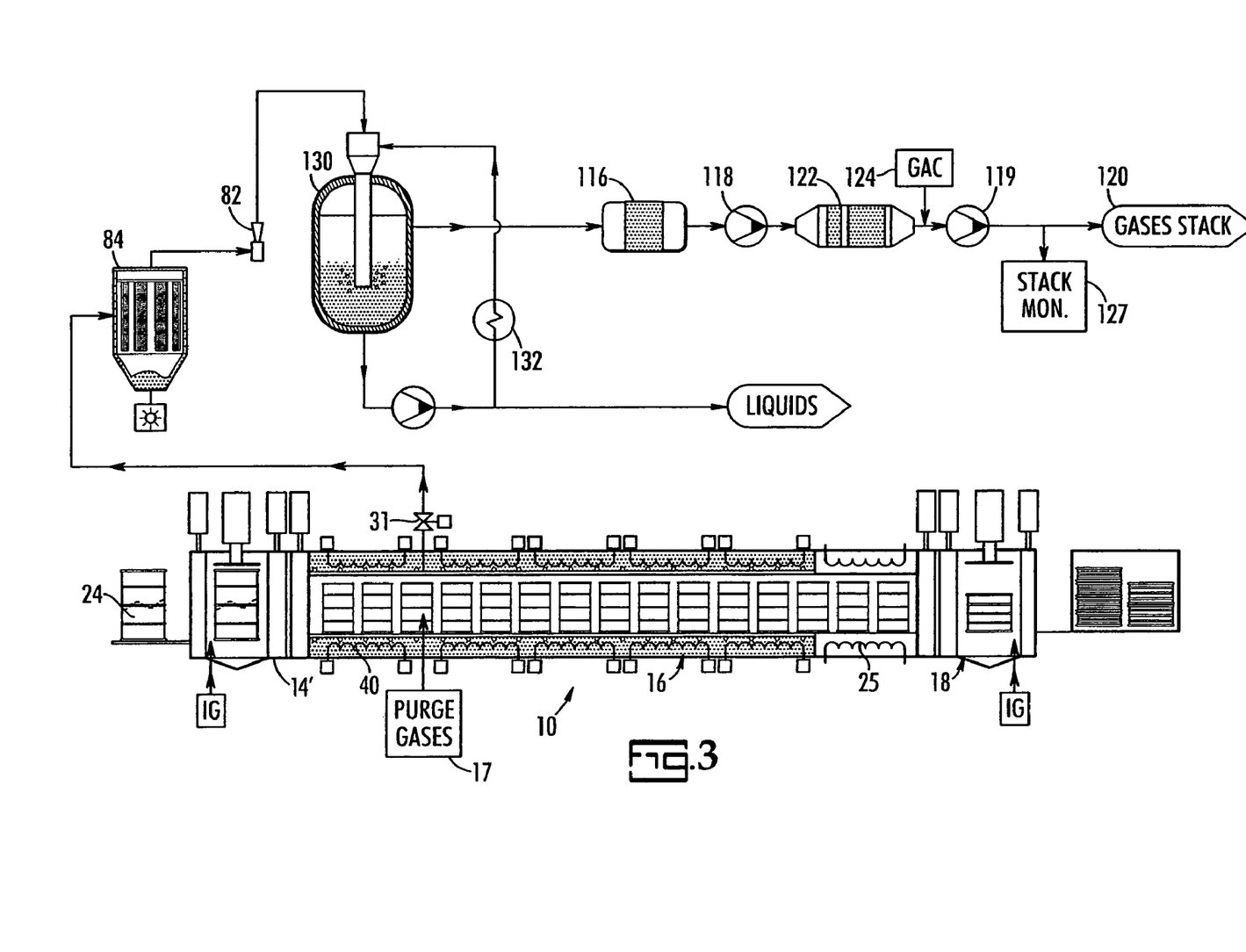
FIG. 3 is a schematic illustration of a system for processing containerized waste including a pyrolyzer and a vapor condenser that are in fluid communication according to an alternative embodiment of the present invention.

Referring now to FIG. 3, there is shown an alternative embodiment of the present invention. In a process similar to the one previously described, plural drums 24 are introduced into pyrolyzer 10 for the volatizing of organics present in drums 24. Once the organics have been vaporized into the pyrolysis gases, low flow gas purge from the purge gas supply 17 is used to sweep the pyrolysis gases out of the pyrolysis chamber 16 so that they can be further processed by off-gas treatment system 80 that is in fluid communication with pyrolyzer 10. As illustrated, off-gas treatment system 80 no longer includes steam reformer 12, but instead includes a condenser 130. In condenser 130, the water vapor and organics present in the off-gas stream will condense into liquid which is either pumped downstream for further processing by steam reformer 12 or for disposal, or it is recirculated into condenser 130 after passing through a chiller/cooler 132. The non-condensable gases from condenser 130 are discharged through gases stack 120. Before being discharged, the non-condensable gas stream goes through demister 116 for removal of liquid droplets. Next, process blower 118 sends gas stream through GAC filter 124 and HEPA filter 122 before ventilation blower 119 discharges gas stream through gases stack 120. Pressure/vacuum cycle swings in the pyrolyzer 10 can be provided by adjusting the speed and hence vacuum that is produced by process blower 118 or by cycling open/closed the pyrolyzer outlet gas flow control valve 31. Alternatively, and preferably, cooling of the drums 24 or containers can be efficiently achieved by direct cooling using a finely atomized spray or water droplets that have a very high surface area as shown in FIG. 2A. The fine mist of water droplets quickly adsorbs heat from the gases in the pyrolizer 10, from radiated and convective heat from the drum 24 or container, and from the inner walls of the cooling section of the pyrolyzer 10. The water droplets evaporate into steam that is carried out of the pyrolyzer 10 to the off-gas system 80. This direct cooling method maintains surfaces dry in the pyrolyzer 10 and provides cooling that can be as much as an order of magnitude faster than indirect cooling and/or allowing the drum 24 or container to cool without cooling. For batch type operation of the pyrolyzer 10, the waste drum 24 or container can be inserted into the pyrolyzer 10 and sealed and the heating cycle performed. Following the heat step, rapid cooling can be achieved of the drum 24 or container of waste residues as well as of the pyrolyzer inner sleeve 20 by using the direct water spray cooling method. This is a significant advantage of the invention as it provides improved treatment times by as much as a factor of 2 times. The water mist cooling can be provided by introducing the water mist preferably into the actually inner pyrolysis chamber or alternatively outside of the chamber so that in the latter case the steam is not mixed with the pyrolyzer gases.

Figure 4:
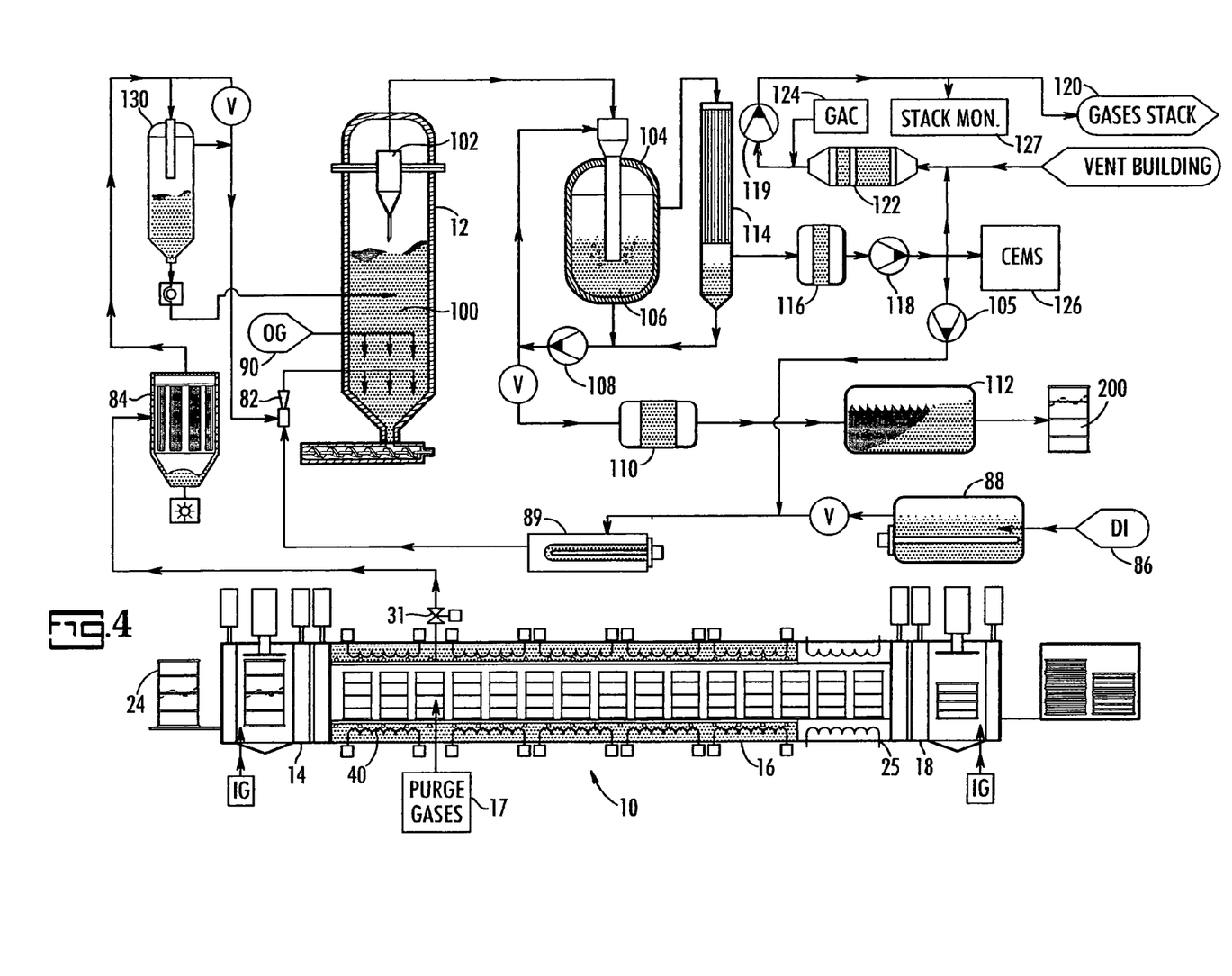
FIG. 4 is a schematic illustration of a system for processing containerized waste including a pyrolyzer, a steam reformer, and a vapor condenser that are in fluid communication according to an alternative embodiment of the present invention.

FIG. 4 illustrates another alternative embodiment of the present invention. Similar to the previously described embodiments, plural drums 24 are introduced into pyrolyzer 10 for the volatizing of organics present in drums 24. Once the organics have been vaporized into the pyrolysis gases, low flow gas purge from the purge gas supply 17 is used to sweep the pyrolysis gases out of the pyrolysis chamber 16 so that they can be further processed by off-gas treatment system 80 that is in fluid communication with pyrolyzer 10. As illustrated, off-gas treatment system 80 includes both condenser 130 and steam reformer 12 that are also in fluid communication. In condenser 130, the water vapor and organics present in the off-gas stream will condense into liquid, which is pumped into steam reformer 12 for further processing. The non-condensable gases from the off-gas stream are continuously drawn into steam reformer 12 by eductor 82. These gases and steam mix to form the fluidizing gases for the steam reformer 12. Further, oxidizing gas is introduced into the steam reformer 12. At this stage, the method proceeds as with the preferred embodiment, including the neutralization of acid gases in downstream scrubber 104, and the processing of secondary waste streams by various means, such as salt waste disposal and process filters. Alternatively, and preferably, cooling of the drums 24 or containers can be efficiently achieved by direct cooling using a finely atomized spray or water droplets that have a very high surface area. The fine mist of water droplets quickly adsorbs heat from the gases in the pyrolyzer 10, from radiated and convective heat from the drum 24 or container, and from the inner walls of the cooling section of the pyrolyzer 10. The water droplets evaporate into steam that is carried out of the pyrolyzer 10 to the off-gas system 80. This direct cooling method maintains surfaces dry in the pyrolyzer 10 and provides cooling that can be as much as an order of magnitude faster than indirect cooling and/or allowing the drum 24 or container to cool without cooling. For batch type operation of the pyrolyzer 10, the waste drum 24 or container can be inserted into the pyrolyzer 10 and sealed and the heating cycle performed. Following the heat step, rapid cooling can be achieved of the drum 24 or container of waste residues as well as of the pyrolyzer inner sleeve 20 by using the direct water spry cooling method. This is a significant advantage of the invention as it provides improved treatment times by as much as a factor of 2 times. The water mist cooling can be provided by introducing the water mist preferably into the actually inner pyrolysis chamber or alternatively outside of the chamber so that in the latter case the steam is not mixed with the pyrolyzer gases.

Figure 5:
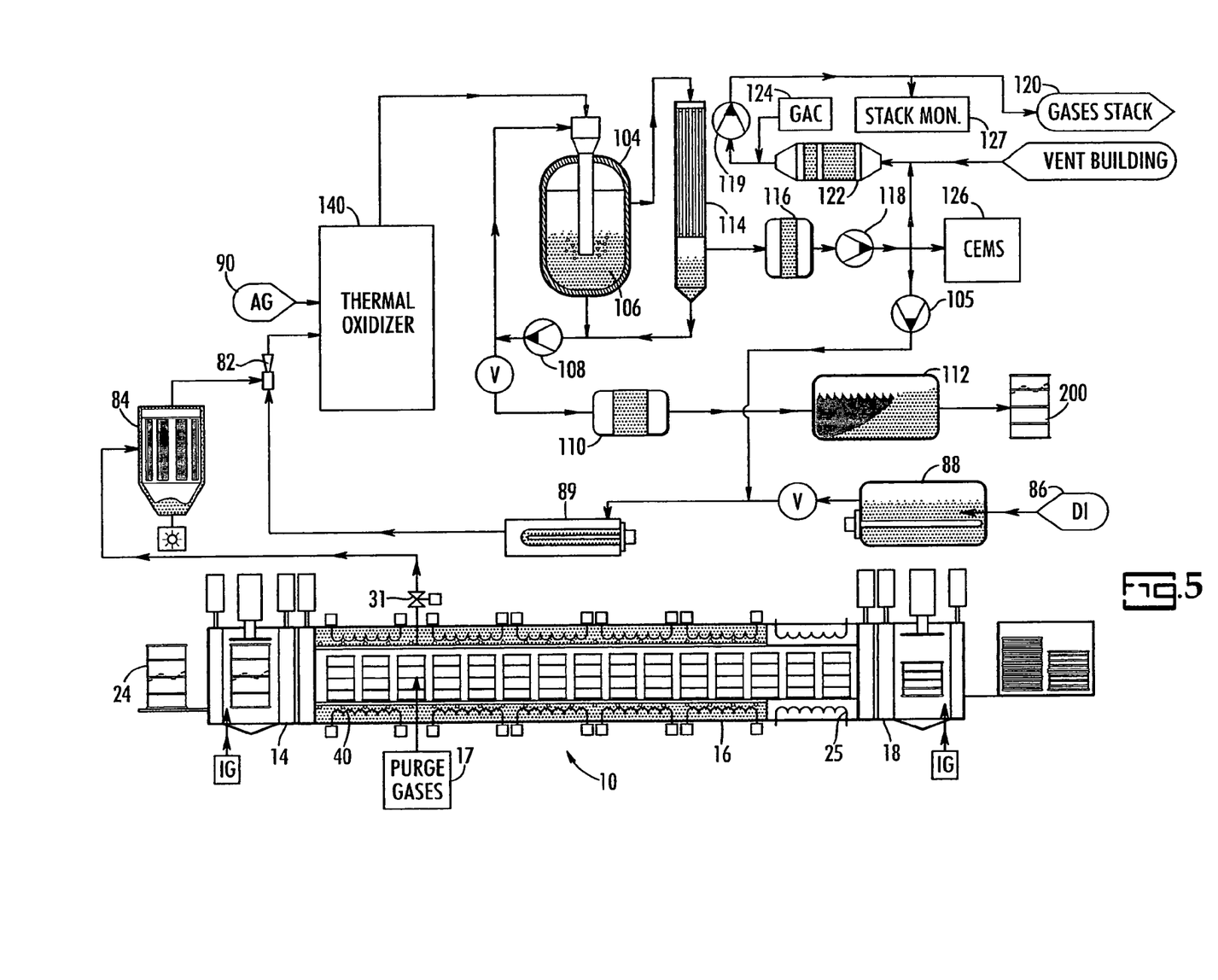
FIG. 5 is a schematic illustration of a system for processing containerized waste including a pyrolyzer and a thermal oxidizer that are in fluid communication according to an alternative embodiment of the present invention.

Yet another alternative embodiment is illustrated in FIG. 5. Similar to the previously described embodiments, plural drums 24 are introduced into pyrolyzer 10 for the volatizing of organics present in drums 24. Once the organics have been vaporized into the pyrolysis gases, low flow gas purge from the purge gas supply 17 is used to sweep the pyrolysis gases out of the pyrolysis chamber 16 so that they can be further processed by off-gas treatment system 80 that is in fluid communication with pyrolyzer 10. As illustrated, off-gas treatment system 80 includes a thermal oxidizer 140, such as a catalytic converter, a ceramic matrix, or a standard combustion oxidizer, in the place of steam reformer 12. This off-gas treatment system 80 operates similarly to a system including steam reformer 12, in that off-gases are converted to water vapor and carbon dioxide in thermal oxidizer. Further, the acid gases present in the gas stream are neutralized by downstream scrubber 104. This alternative embodiment further includes the processing of secondary waste streams by various means, such as salt waste disposal and process filters. Alternatively, and preferably, cooling of the drums 24 or containers can be efficiently achieved by direct cooling using a finely atomized spray or water droplets that have a very high surface area. The fine mist of water droplets quickly adsorbs heat from the gases in the pyrolyzer 10, from radiated and convective heat from the drum 24 or container, and from the inner walls of the cooling section of the pyrolyzer 10. The water droplets evaporate into steam that is carried out of the pyrolyzer 10 to the off-gas system 80. This direct cooling method maintains surfaces dry in the pyrolyzer 10 and provides cooling that can be as much as an order of magnitude faster than indirect cooling and/or allowing the drum 24 or container to cool without cooling. For batch type operation of the pyrolyzer 10, the waste drum 24 or container can be inserted into the pyrolyzer 10 and sealed and the heating cycle performed. Following the heat step, rapid cooling can be achieved of the drum 24 or container of waste residues as well as of the pyrolyzer inner sleeve 20 by using the direct water spry cooling method. This is a significant advantage of the invention as it provides improved treatment times by as much as a factor of 2 times. The water mist cooling can be provided by introducing the water mist preferably into the actually inner pyrolysis chamber or alternatively outside of the chamber so that in the latter case the steam is not mixed with the pyrolyzer gases.

It will be apparent to those skilled in the art of processing drummed wastes that many modifications and substitutions can be made to the preferred embodiments described above without departing from the spirit and scope of the present invention, which is defined by the appended claims.

What is claimed is:

1. An apparatus for processing waste in drums, comprising:
a pyrolyzer having a waste inlet, a pyrolysis chamber having an inner sleeve within an outer vessel, and means for heating that is in operational communication with said pyrolysis chamber, said pyrolyzer producing an off-gas; and
means for collecting and processing said off-gas that is in fluid communication with said pyrolyzer.

2. The apparatus as recited in claim 1, wherein said inner sleeve and said outer vessel form an annulus, said heating means being within said annulus.

3. The apparatus as recited in claim 2, wherein said heating means is an electrical heater.

4. The apparatus as recited in claim 2, wherein said heating means is combustion fired heat.

5. The apparatus as recited in claim 1, wherein said heating means is within said inner sleeve.

6. The apparatus as recited in claim 5, wherein said heating means is an electrical heater having an alloy sleeve.

7. The apparatus as recited in claim 1, wherein said inner sleeve is dimensioned to receive plural drums of waste.

8. The apparatus as recited in claim 1, wherein said outer vessel is a refractory jacket cover.

9. The apparatus as recited in claim 1, wherein said outer vessel is an insulation jacket cover.

10. The apparatus as recited in claim 1, wherein said outer vessel is a metal shell.

11. The apparatus as recited in claim 1, wherein said outer vessel is a pressure vessel.

12. The apparatus as recited in claim 1, wherein said waste inlet is a gas outlet.

13. The apparatus as recited in claim 1, wherein said pyrolyzer includes a gas outlet.

14. The apparatus as recited in claim 13, wherein said waste inlet and said gas outlet include airlocks.

15. The apparatus as recited in claim 13, wherein said gas outlet includes a compactor.

16. The apparatus as recited in claim 1, wherein said waste inlet includes a drum filter application device.

17. The apparatus as recited in claim 1, wherein said pyrolysis chamber includes a purge gas supply.

18. The apparatus as recited in claim 17, wherein said purge gas supply comprises at least one of an inert gas, a reactive gas, or $CO_2$.

19. The apparatus as recited in claim 1, wherein said pyrolyzer includes a drum transfer mechanism.

20. The apparatus as recited in claim 19, wherein said drum transfer mechanism is a walking beam transfer.

21. The apparatus as recited in claim 19, wherein said drum transfer is an inclined plane transfer.

22. The apparatus as recited in claim 1, further comprising means for creating pressure swings in said pyrolyzer.

23. The apparatus as recited in claim 22, wherein said pressure swing creating means is a pressure valve that is operatively connected to said pyrolysis chamber.

24. The apparatus as recited in claim 1, further comprising means for neutralizing said off-gas.

25. The apparatus as recited in claim 24, wherein said neutralizing means is a scrubber.

26. The apparatus as recited in claim 24, wherein said neutralizing means is a steam reformer containing neutralization agents.

27. The apparatus as recited in claim 1, further comprising means for creating vacuum swings in said pyrolyzer.

28. The apparatus as recited in claim 27, wherein said vacuum creating means is an eductor that is operatively connected to said pyrolysis chamber.

29. The apparatus as recited in claim 1, further comprising a drum filter application device contained within said waste inlet.

30. The apparatus as recited in claim 29, wherein said drum filter application device includes a filter bag that is dimensioned to receive a drum.

31. The apparatus as recited in claim 29, wherein said drum filter application device includes an outer container having an integral filter that is dimensioned to receive a drum.

32. The apparatus as recited in claim 1, further comprising a water cooling device that is operatively connected to said pyrolysis chamber.

33. The apparatus as recited in claim 32, wherein said water cooling device includes a source of water and a source of atomizing gas that are in fluid connection to said inner sleeve of said pyrolysis chamber.

34. The apparatus as recited in claim 32, wherein said water cooling device includes a plurality of spray nozzles.

35. The apparatus as recited in claim 1, further comprising means for neutralizing waste materials contained in drums.

36. The apparatus as recited in claim 35, wherein said neutralizing means is a neutralizing agent.

37. The apparatus as recited in claim 35, wherein said neutralizing agent is $CO_2$ gas.

* * * * *